Figure 4:
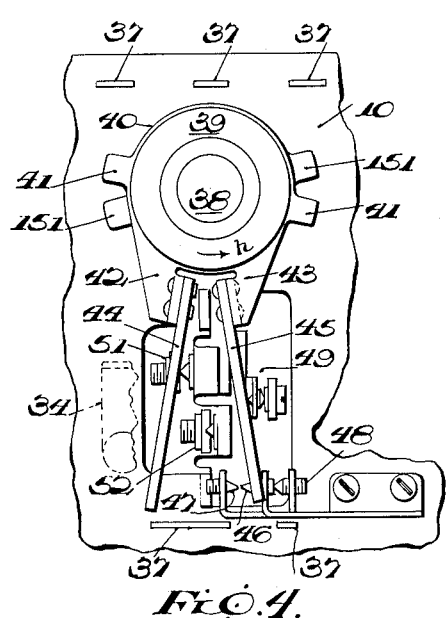

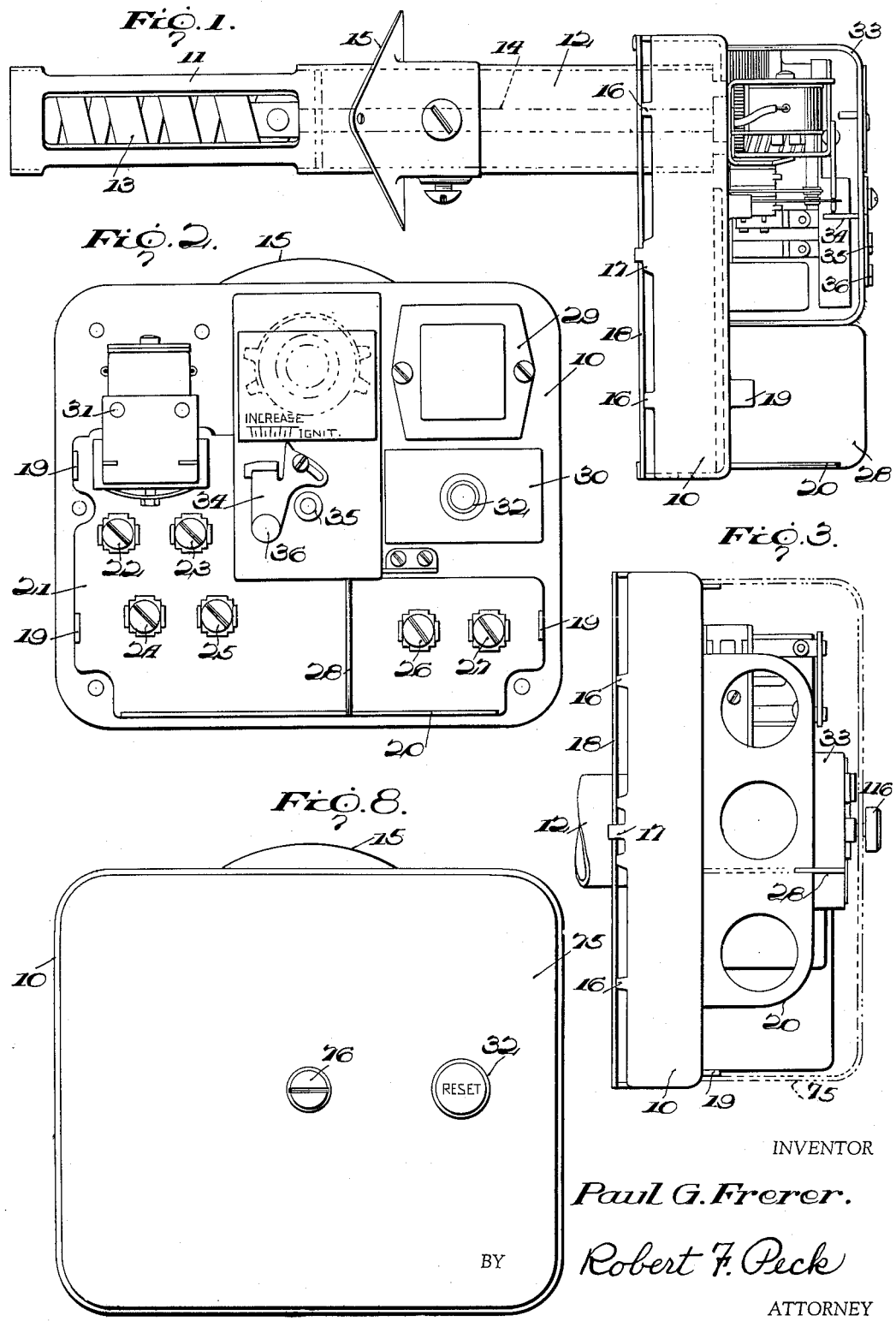

Jan. 10, 1956  P. G. FRERER  2,730,593
BURNER CONTROL DEVICE
Original Filed June 15, 1948  2 Sheets-Sheet 2

INVENTOR

*Paul G. Frerer.*

BY *Robert F. Peck*

ATTORNEY

United States Patent Office 2,730,593
Patented Jan. 10, 1956

2,730,593
BURNER CONTROL DEVICE

Paul G. Frerer, Peru, Ill., assignor to Bendix Aviation Corporation, Baltimore, Md., a corporation of Delaware Original application June 15, 1948, Serial No. 33,129. Divided and this application March 11, 1952, Serial No. 275,980

7 Claims. (Cl. 200—138)

This invention relates to apparatus for controlling the operation of automatically fired heating installations and more particularly to a stack-mounted primary control especially adapted to the needs of oil burning systems, and is a division of my copending application, Serial Number 33,129, filed June 15, 1948, now abandoned.

The design of a control unit for use in conjunction with automatically controlled heating installations presents a surprising complexity of problems which may be theoretical, mechanical or electrical in nature. The primary stimulus is generally derived from a relatively simple thermostat situated in the space whose temperature is to be controlled. Such a thermostat normally either closes an electric circuit or opens an electric circuit upon temperature fall, the choice in any given design reflecting the reaction of the designer to the various factors involved. The thermostats most frequently employed are those presenting a closed circuit when the ambient temperature falls below the preset level. In response to this simple circuit closure, a considerable variety of events must happen or be capable of occurring in response to the many different conditions which may be observed at the initiation of, during the continuation of, and subsequent to the termination of burner operation. The intermediate control unit linking the thermostat and the burner must reliably start the burner, watch over its operation until it has insured the establishment of combustion, must thereafter continue to watch over the burner operation guarding it against fuel and power failures until the thermostat ceases to call for heat, at which time it must shut the burner down safely. Thereafter, to prevent possible explosions or "puffs" it must restrain the burner from returning to service before the combustion chamber has cooled sufficiently. The problems are further complicated by the fact that in the case of failure of any part of this primary control unit, as it is designated, the failure must react to remove the burner from service and prevent it from thereafter operating until the trouble has been located and corrected, after which the operator of the heating installation resets the safety device on the primary control unit and returns the system to operation. In satisfying these performance requirements, it is necessary among other things that an electric switch governing the burner operation open at a temperature higher than that required to close it when the burner is being started, in addition to the fact that the sequence of operation of this switch with respect to other controlling switches must be carefully controlled and unerringly predictable.

In addition to these theoretical and electrical considerations, the tasks of the mechanic charged with the responsibility of installing the heating system must also be borne in mind. He must be able to install the primary control unit in its normal position on the stack, anchor the necessary electrical conduits thereto, complete the necessary electrical connections, correctly initiate the starting cycle, and make the necessary adjustments conveniently without repeatedly removing and replacing the protective cover element or the unit itself. Hence the removal and replacement of the protective cover must not in any way affect the operation of the primary control.

Furthermore, the control device must possess a simplicity of structure lending itself to convenient, economical, large-scale production. Where possible the elements comprising the assembly should be reversible in nature so that no matter how the assembler picks them up they may be at once inserted in the unit with satisfactory results in the final product. Furthermore, since the elements carried on the control unit will be affected to a greater or lesser degree by changes in their temperature, an effective heat barrier must be present between the operating assembly of the primary control unit and the stack to which it is connected. Multiple use of the component parts of the primary control offers an attractive route to manufacturing economy and, often, enhances reliability in service. Also, the relative positioning of the elements comprising the primary control may determine in a large measure the facility and economy of manufacture, both from the standpoint of tooling and the subsequent assembly and calibration operations required.

It is a primary object of the invention to provide a new and novel oil burner primary control having a minimum number of non-critical parts.

Another object of the invention is to provide a new and novel burner control with a spatial distribution of parts making for ease of assembly, inspection and calibration.

A further object of the invention is to provide a new and novel thermal control device with switches intended to operate in a predetermined sequence in which the proper operating sequence may be conveniently established after installation.

Yet another object of the invention is to provide an improved slip-friction drive assembly.

Figure 5:
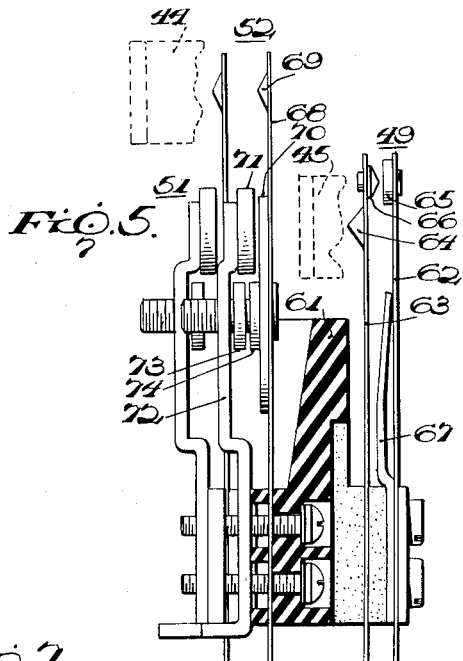
Figure 7:
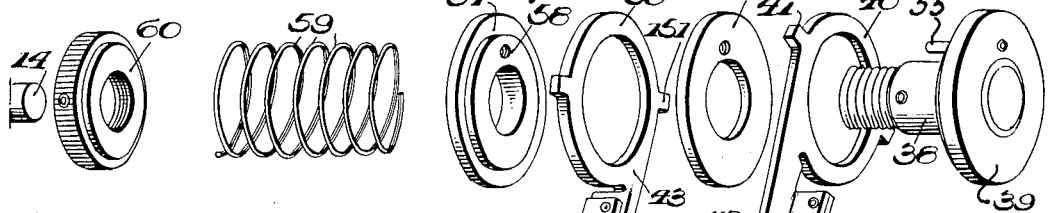
Figure 6:
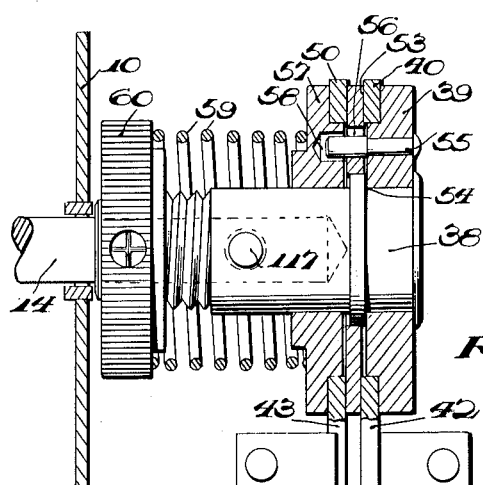

Other objects and advantages of the invention will in part be described and in part be obvious when the following specification is read in conjunction with the drawings in which:

Figure 1 is a side view of the improved control device with the cover removed,

Figure 2 is a front view of the improved control device also with the cover removed, Figure 3 is a bottom view of the improved control device with the cover shown as a phantom outline, Figure 4 illustrates in detail the relationship between the slip-friction driven members and the electric switching elements, Figure 5 is a side view partly in section illustrating an improved electric switch forming a part of the control device, Figure 6 is a view partly in section illustrating the slip-friction drive assembly, Figure 7 is an exploded view of the same slip-friction drive assembly, Figure 8 is a front view of the control device with the cover in place.

Referring now to Figures 1, 2 and 3, the completed control device is seen to include a base member 10 to which there is attached a member 12 generally tubular in form. The end of the tubular extension 12 abutting the base 10 may be provided with projecting lugs extending through corresponding slots in the base 10 and twisted over on the front side of the base member to lock the tubular extension 12 in place. The extension 12 is slotted at four circumferentially spaced points 11, as indicated in Figure 1, and a helical bimetal 13 is situated within the region thus exposed, with one end anchored to a bracket on the extension 12 and its other end connected with the drive shaft or rod 14 extending along the tubular extension 12 through appropriate bearing points and thence through an aperture in the base 10 to the slip-friction drive element later to be described. The bimetal 13 may be a conventional element formed by laminating metals having dissimilar temperature coefficients of expansion and thereafter formed into the proper shape. In the presence of changing temperatures, the bimetal tends to twist and untwist, converting the temperature variations into angular deflections. Since this element is intended for mounting on the furnace smokepipe, a correspondingly curved fitting 15 is secured to the tube 12 in such a position that when it is attached to the smokepipe the bimetal 13 will extend into the flue passages and be exposed to the influences of the combustion gases.

The depending walls of the base 10 carry projecting lugs 16 and 17, the latter being the broader and including a projecting tongue whose purpose will later become apparent. A heat shield 18, apertured to clear the tubular extension 12, seats on the lugs 16 and the extended shoulders of the lugs 17, and is secured in place by bending the projecting tongue of the lug 17 inwardly. For convenience in assembly, the heat shield 18 may be notched to assist in locating the proper position for it with respect to the tongue of the lugs 17, and at least the side facing the bimetal 13 may be highly polished to reflect any radiant energy incident thereon. The lugs 16 and 17 serve to space the heat barrier 18 from the depending walls of the base 10 over the greater portion of its periphery to afford a continuous circulation of air assisting in maintaining the base 10 and component parts mounted thereon at a relatively low temperature.

Three lugs 19 are struck upwardly out of the material of the base 10 adjacent the edges of its face and serve as locating members guiding the cover into its proper position. A conduit anchor plate 20 may be similarly struck up along the bottom edge of the base 10 and is provided with conduit receiving apertures. A sheet of insulation 21 may also be secured to the base 10, as by riveting, and carries the terminals 22, 23, 24, 25, 26 and 27 whose association with the operating circuits will later become clear.

A metallic barrier 28 is situated between terminal 25 and terminal 26 and secured by lugs engaging corresponding slots in the anchor plate 20 and insulation sheet 21. Additional operating elements carried by the base 10 are the transformer 29, adapted to deliver a low voltage in response to high voltage excitation, a safety switch 30 of conventional twin-bimetal and latch-bar construction, and a relay 31 actuating double-pole single-throw normally disengaged contacts. The upper surface of the cover for safety switch 30 is apertured to receive a reset button 32 re-engaging the latch bar in operating position after actuation of the safety switch in response to a system failure.

The combustion responsive switching assembly driven by the angular deflections occurring in the driving bimetal 13 is only indistinctly shown in Figure 1 and not at all in Figures 2 and 3 because it is concealed from view by the U-shaped guard 33 extending thereover and shielding these elements from accidental disturbance. The guard 33 has an extruded threaded aperture 35 receiving the cover retaining screw 116 and also carries an adjustable stop 34 pivoted at 36. This stop extends through a slot in the guard 33 and may be locked in position by tightening a a locking screw in turn engaging a slot therein. A pointer extension of the stop-carrying member 34 extends adjacent a scale enabling a convenient estimate of the ignition adjustment.

The combustion responsive switching assembly is portrayed in greater detail in Figure 4 which is a close-up front view of the control device with the guard 33 removed and only the formerly concealed elements shown. This view shows the guard mounting slots 37 in the base 10 quite clearly. This view also shows the drive hub 38 which is mounted on the shaft 14, as well as a driven clutch member shown in the form of a collar 39 anchored to the drive hub 38 by rolling over the outer portion thereof. The slip-friction assembly (shown in greater detail in Figure 6) includes a driven member in the form of a ring or annulus 40 having an extension 42 to which there is secured the extended insulating switch-actuating arm 44 movable between the stop 46 secured to the base 10 and the stop 34 carried on the guard 33. Spaced therefrom by an annular friction washer 53 is a second driven member in the form of a complementary ring or annulus 50 having an extension 43 to which there is secured another switch-actuating arm 45 of insulating material movable between the adjustable stops 47 and 48 which may also be secured to the base 10. The annular driven member 40 has a pair of legs 41 projecting radially outwardly from the periphery thereof, while the annular driven member 50 is provided with a similar pair of lugs 151.

The switching elements actuated by the arms 44 and 45 include elongated members extending up out of the plane of the drawing in Figure 4 carrying the necessary contacts and other cooperating elements. The detail of this structure will be carefully explained later in connection with Figure 5. It suffices at this point to note that the arm 45, upon counterclockwise rotation, engages and closes the normally open switch indicated at 49, thereafter striking the stop member 48 which restrains the arm 45 from further travel. Cooling of the driving bimetal 13 produces clockwise rotation disengaging the arm 45 from the stop 48 and thereafter releasing the normally closed switch 49, thus permitting it to open. Further cooling of the driving bimetal 13 brings the arm 45 into engagement with the back stop 47 where it is restrained from further movement despite a continuing decrease in the temperature of the driving element.

The action of the arm 44 is somewhat similar except that the wider spacing of the associated stops permits it a greater latitude of movement. Upon a rise in temperature, the resulting counterclockwise movement of the arm 44 first picks up the actuator of switch 51 to disengage its normally closed contacts and thereafter displaces the actuator for normally closed contacts 52 after which it reaches the stop 46 and is restrained from further movement despite further increases in temperature. A decrease in the temperature of the thermal driving unit 13 produces clockwise rotation of the insulating arm 44, first disengaging it from the stop 46 and then successively permitting the closing of contacts 51 and 52, after which the arm reaches the stop 34 carried on the guard 33. As has been earlier noted, the position of this stop is adjustable and setting it to the left will delay the time when contacts 51 and 52 are actuated in response to a rise in temperature.

A better comprehension of the physical make-up of the slip-friction drive unit just outlined may be obtained from an inspection of Figure 6 and the exploded view of Figure 7. The drive hub 38 is drilled to accommodate the drive shaft 14 secured thereto by a set screw in the aperture 117. In addition, the drive hub 38 is provided with a collar 54, and the driving ring 39 is secured between the end of the drive hub 38 and the collar 54 by rolling over the extended end. A drive pin 55 is fixed in the driving ring 39 and extends in a direction parallel to the axis of rotation. The drive ring 39 itself is cut away along one edge to accommodate the annular driven ring 40 whose inner radius is sufficiently great to clear the drive pin 55 as shown in the drawings. Next in order in the assembly is the annular friction washer 53 whose inner diameter rests on the collar 54 and which is traversed by the aperture 56 receiving the drive pin 55. This friction washer in turn abuts the second annular driven member 50 whose inner diameter again clears the drive pin 55 and which is located in a cut-out portion of an axially movable clutch member in the form of a sleeve 57 freely revoluble on the drive hub 38. A pressure spring 59 rests on a step of the sleeve 57 and is maintained under compression by the nut 60 threaded on the left-hand end of the drive hub 38. As indicated in the drawing, the shaft 14 extends from the drive hub 38 through a conventional bearing in the base member 10. It is immediately obvious that the actuating arms 44 and 45 are driven in response to rotation of the drive shaft 14 until they meet a resistance imposing a load greater than the friction forces developed at the annular driven rings 40 and 50. The maximum friction force which can be developed at this point is controlled, of course, by the coefficient of friction of the members comprising the assembly and by the compression to which the loading spring 59 is subjected. Hence, advancing and withdrawing the nut 60 by rotating same upon the threaded portion of the drive hub 38 affords a convenient method of controlling the force developed in these actuating arms.

Inasmuch as the switching combination driven by the actuating arms 44 and 45 presents some unusual features, it has been treated in detail in Figure 5. This switching combination is the subject matter of another divisional application, Serial Number 275,979 filed of even date herewith, but will be described herein in detail, to show its association with the burner control device shown and claimed herein. The component parts of these switches are assembled on the insulating base 61. The normally open switch 49 is made up of contacts 65 and 66 mounted respectively on the flexible members 62 and 63 having one of their ends anchored to the insulating block 61 by screws and appropriate spacers. A rigid stop 67 governs the contact clearance by restraining forward motion of the flexible contact carrying member 62, and a dimple 64, formed in the contact carrying member 63, provides a known and reproducible drive point for the associated arm 45 appearing here in dashed lines.

The assembly of switches 51 and 52 differs materially from that of the switch 49 to economically and conveniently provide for the required snap action at make and break. The mounting for the elements comprising the switch 52 is shown in section and will be first discussed. This switching assembly includes a relatively flexible member 68 and a relatively rigid bracket member 72 secured at one end to the insulation block 61 by the usual combination of screws and spacers, the apertures in the bracket 72 being tapped to accommodate the mounting screws. A circular magnet 71, characterized by sufficiently high coercive force to permit magnetization with diametrically spaced poles, is secured to the free end of the bracket 72. As shown in the illustration, the bracket 72 is provided with an off-set intermediate its length, and the adjustable contact 73 is carried by the bracket 72 from this off-set portion in opposition to a corresponding contact 74 mounted on the flexible member 68. The contact 74 serves also to secure the paramagnetic armature 70 to the flexible spring 68. It should here be noted that for maximum convenience of assembly, it is desired that the paramagnetic armature 70 have a length approximately equal to twice the distance between the center of contact 73 and the far edge of the magnet 71, with the mounting aperture approximately centrally located so that the switch will function properly whatever the orientation of this part. As in the switch 49, the flexible spring or contact carrying member 68 is dimpled at 69 to provide a well-defined drive point for operating arm 44. Since the make-up of the switch 51 may be, and has for purposes of illustration been chosen as, identical to that of the switch 52, no separate description of its assembly will be undertaken here.

The switch 52, like switch 51, is normally closed, which is to say that contacts 73 and 74 are in engagement. The spacing of these contacts is so adjusted that in the normally closed position the armature 70 does not mechanically engage the magnet 71, if a low differential of operation is required. This limitation may be dispensed with, however, in many types of service. As the actuator arm 44 moves to the right in Figure 5, it approaches and finally engages the driving dimple 69 on the spring member 68. With continuing movement of the driving arm 44, the armature 70 does not at once move away from the magnet 71 because of the tractive effort exerted thereby. Thus the initial movement of the actuating arm 44 after engagement of the driving dimple serves only to deflect the spring 68 and store energy later to be utilized in producing a snap action. The further movement of the actuating arm 44 continues to deflect the spring 68 until the force built up therein at the magnet 71 equals the tractive effort developed between it and the armature 70. The resulting movement of the armature 70 moves it away from the working face of the magnet 71, rapidly diminishing the magnetic flux to which it is subjected and correspondingly reducing the tractive effort whereupon the energy stored in the deflection of the spring 68 manifests itself by quickly separating contact 74 from the stationary contact 73. Conversely, as the arm 44 moves to the left in response to a decrease in temperature of the thermal driving unit 13, the contact carrying spring 68 moves uniformly with it until the armature 70 moves in to a sufficiently strong field region of the magnet 71, at which time the attraction of the magnet 71 moves it swiftly to the left, carrying with it contact 74 to engage cooperating contact 73 with a quick action. Since the operation of the similar switch 51 is identical in nature, differing only in timing due to the spacing of the contact spring, it is apparent that no further discussion of its action is required.

As the person using domestic heating equipment is not generally intimately acquainted with its characteristics and nature, it is advisable to make its operation as obvious and simple as possible. It is to this end that the disposition and location of the safety switch 30 has been chosen with a large reset button 32 projecting toward the front of the device and through a cooperating aperture in the cover as shown in Figure 8. The cover mounting screw 76 is captively secured to the cover 75 and aligned with the tapped extruded opening 35 in the guard 33.

The mechanical layout of this control unit makes it unusually convenient for the installer and the service man since, referring to Figures 2 and 3, he may run the conduits to the device and secure them to the conduit anchor plate 20, thereafter making the desired connections to the terminals carried on the insulating strip 21. The barrier 28 insures against inadvertent bridging of the high and low voltage contacts. After all the connections have been completed, he may operate the furnace with the cover removed and have all test points exposed for ready accessibility. The burner may then be operated while observing its characteristics, and the adjustable stop 34 set for the desired ignition time.

Previously, attention has been called to the control sequence of operation of the switches 49, 51 and 52. When the control unit is installed, it becomes necessary to "time" the combustion switching assembly to insure this sequence. In the control and slip-friction drive unit illustrated, this timing is a simple operation because of the presence of projecting lugs 41 and 151 on the annular driven members of the slip-friction unit. There is sufficient clearance under the guard 33 and between the guard 33 and the relay 31 to permit the introduction of the digits at this point for manipulation of all switches to their cold positions, prior to the first burner starting cycle. Thereafter, the relative positioning of the stops, with respect to the operating arms 44 and 45, insures the continuance of the desired timing or switching sequence.

With the foregoing in mind, there will be obvious to those skilled in the art many minor modifications and variations not departing essentially from the principles of the invention.

What is claimed and desired to be secured by United States Letters Patent is:

1. In a control device of the type specified, a thermal control unit including a rotatable shaft and a temperature-responsive element operatively connected to said shaft for rotating the latter as a function of changes in temperature, a pair of clutch members mounted on said shaft for rotation therewith, at least one of said members having limited relative clutch movement in a direction axially of said shaft, a plurality of annular members disposed between said clutch members for rotation through frictional engagement with the latter, a frictional spacing ring interposed between said annular members, switch-actuating arms projecting radially from said annular members, resilient means urging said clutch members into such frictional engagement, switch elements located in the angular path traversed by said arms, and stops arranged to determine the limit of rotation of said arms.

2. In a control device of the type specified, a base member, a thermal control unit supported by said base member and including a rotatable shaft and a temperature responsive element operatively connected to said shaft for rotating the latter as a function of changes in temperature, a pair of clutch members mounted on said shaft for rotation therewith, at least one of said members having limited relative clutch movement in a direction axially of said shaft, a pair of annular members disposed between said clutch members for rotation through frictional engagement with the latter, a frictional spacing ring interposed between said annular members, means interconnecting said clutch members and said ring for rotation as a unit, switch-actuating arms projecting radially from said annular members, resilient means urging said clutch members into frictional engagement with said annular members and said spacing ring, means or manually adjusting said resilient means, switch elements located in the angular path traversed by said arms, and stops arranged to determine the limit of rotation of said arms.

3. A control device as claimed in claim 2 wherein said base member is provided with a detachable guard and one of said stops is carried by said guard and is adjustable exteriorly of the guard.

4. A control device as claimed in claim 2 wherein said annular members are provided with radially projecting lugs to facilitate timing of the switching sequence.

5. In a control device of the type specified, a base member, a thermal control unit supported by said base member and including a rotatable shaft and a temperature responsive element operatively connected to said shaft for rotating the latter as a function of changes in temperature, a pair of clutch members mounted on said shaft for rotation therewith, one of said clutch members being in the form of a drive ring affixed to said shaft and the other of said members being in the form of an axially-movable sleeve coacting with said ring, a pair of annular members disposed between said clutch members for rotation through frictional engagement with the latter, a frictional spacing ring interposed between said annular members and said clutch members, means interconnecting said clutch members and said spacing ring for rotation as a unit while at the same time permitting axial movement of said sleeve, switch-actuating arms projecting radially from said annular members, a spring encircling said shaft and exerting clutching pressure on said clutch sleeve member, means for manually adjusting said spring, switch elements located in the angular path traversed by said arms, and stops arranged to determine the limit of rotation of said arms.

6. In a control device of the type specified, a base member, a thermal control unit supported by said base member and including a rotatable shaft and a temperature responsive element operatively connected to said shaft for rotating the latter as a function of changes in temperature, a pair of clutch members mounted on said shaft, one of said clutch members being in the form of a drive ring affixed to said shaft for rotation therewith and the other of said clutch members being in the form of a sleeve coacting with said drive ring, a pair of annular members disposed between said clutch members for rotation through frictional engagement with the latter, a frictional spacing ring interposed between said annular members and said clutch members, a drive pin affixed to said drive ring and projecting axially through registering bores formed in said spacing ring and said sleeve, a clutch spring encircling said shaft and exerting clutching pressure on said sleeve, means for adjusting the tension of said spring, switch-actuating arms projecting radially from said annular members, switch elements located in the angular path traversed by said arms, and stops arranged to determine the limit of rotation of said arms.

7. In a control device of the type specified, a base member, a thermal control unit supported by said base member and including a rotatable shaft and a temperature responsive element operatively connected to said shaft for rotating the latter as a function of changes in temperature, a pair of clutch members mounted on said shaft, one of said clutch members being in the form of a drive ring affixed to the outer end of said shaft for rotation therewith and the other of said clutch members being in the form of a disc-shaped sleeve coacting with said ring, the radially outer contiguous faces of said drive ring and sleeve being formed with opposed recesses, a pair of annular members disposed in said recesses between said clutch members for rotation through frictional engagement with the latter, a frictional spacing ring interposed between said annular members and said clutch members, a drive pin affixed to said drive ring and projecting axially through registering bores formed in said spacing ring and said sleeve to thereby cause said clutch members and spacing ring to rotate as a unit, a clutch spring encircling said shaft and exerting clutching pressure on said sleeve, an adjusting nut for said spring threaded on said shaft, switch-actuating arms projecting radially from said annular members, switch elements located in the angular path traversed by said arms, stops arranged to determine the limit of rotation of said arms, and lugs projecting radially from said annular members to facilitate timing of the switching sequence.

References Cited in the file of this patent

UNITED STATES PATENTS

| | | |
|---|---|---|
| 1,969,974 | Erickson | Aug. 14, 1934 |
| 2,069,002 | Beman | Jan. 26, 1937 |
| 2,152,843 | Fisher | Apr. 4, 1939 |
| 2,187,269 | Hutchins et al. | Jan. 16, 1940 |
| 2,227,967 | Favre | Jan. 7, 1941 |
| 2,312,349 | Malone | Mar. 2, 1943 |
| 2,431,771 | Rosche | Dec. 2, 1947 |
| 2,438,454 | Riebe | Mar. 23, 1948 |
| 2,490,073 | Malone | Dec. 6, 1949 |
| 2,512,331 | Hughes | June 20, 1950 |